United States Patent [19]

Sickles

[11] 4,408,849
[45] Oct. 11, 1983

[54] SLIDE MACHINE LOADING APPARATUS

[76] Inventor: Ralph A. Sickles, 1418 Steamboat Bend, Tempe, Ariz. 85283

[21] Appl. No.: 443,431

[22] Filed: Nov. 22, 1982

[51] Int. Cl.³ .......................................... G03B 23/00
[52] U.S. Cl. ............................ 353/103; 353/DIG. 1; 353/117
[58] Field of Search ........................ 353/103, 112–117, 353/107, DIG. 1

[56] References Cited

U.S. PATENT DOCUMENTS

| 4,024,966 | 5/1977 | Schenck | 353/DIG. 1 X |
| 4,226,038 | 10/1980 | Ashworth | 353/DIG. 1 X |
| 4,253,789 | 3/1981 | Hultgren | 353/117 X |

FOREIGN PATENT DOCUMENTS

| 14024 | 8/1980 | European Pat. Off. | 353/103 |
| 2274943 | 1/1976 | France | 353/103 |

Primary Examiner—Stephen Marcus
Assistant Examiner—William R. Sharp
Attorney, Agent, or Firm—Cahill, Sutton & Thomas

[57] ABSTRACT

Apparatus (36, 37 and 38) adapted for association with a projector (11) and a compartmented magazine (12) for containing photographic slides for said projector whereby a stack of slides (42) contained in said apparatus are loaded into said magazine utilizing the slide removing (32, 33) and magazine advancement (29) mechanisms contained within the projector.

5 Claims, 6 Drawing Figures

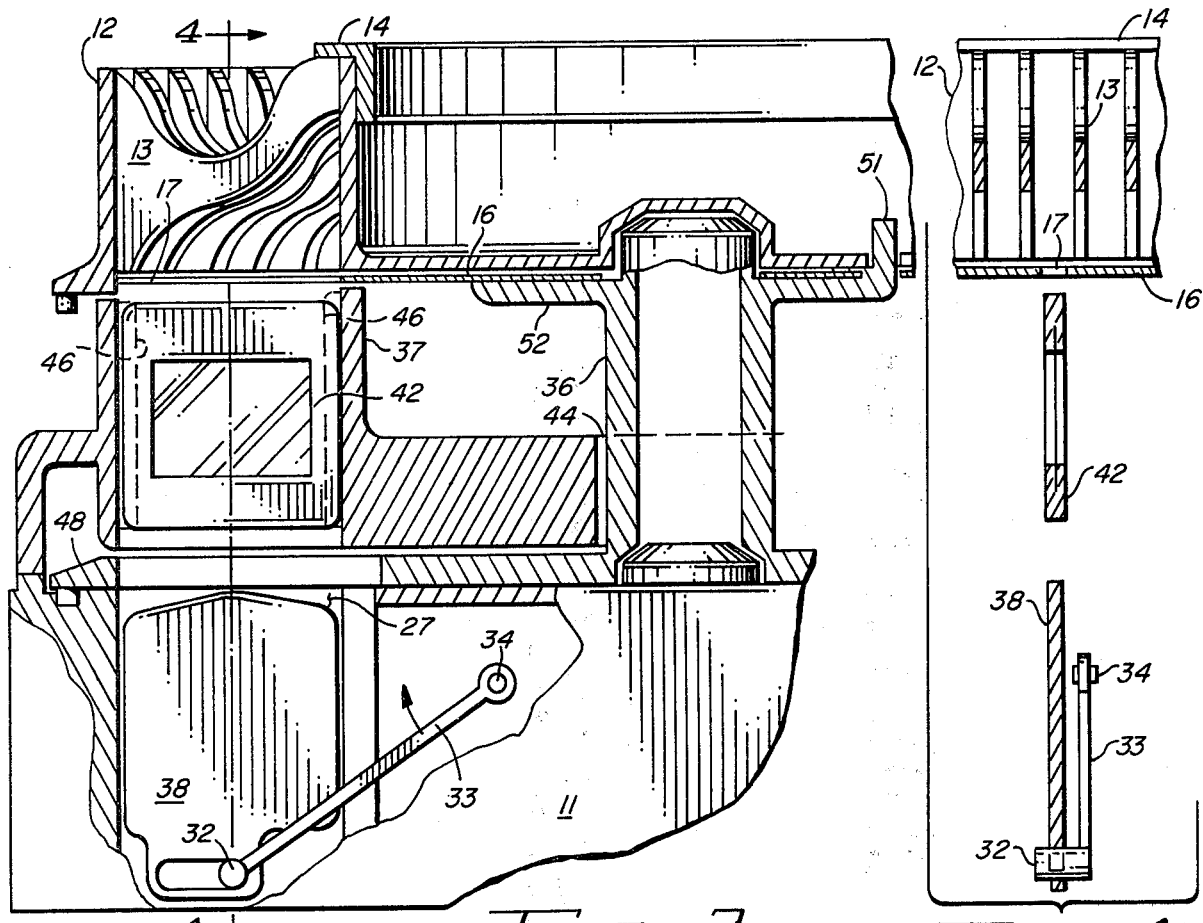
FIG-3
FIG-4
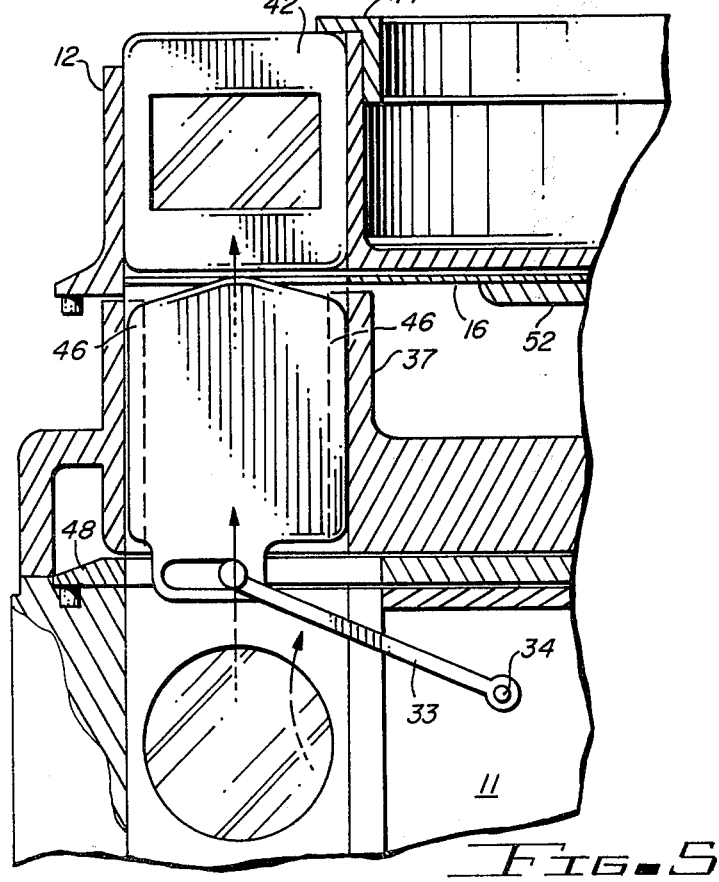
FIG-5
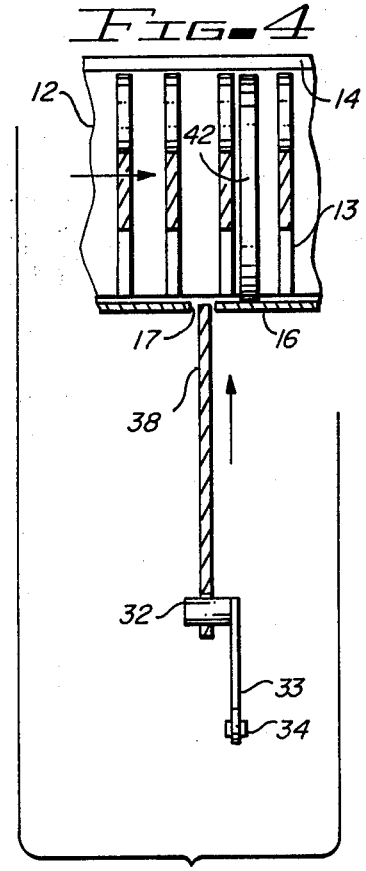
FIG-6

SLIDE MACHINE LOADING APPARATUS

TECHNICAL FIELD

This invention relates to apparatus for loading photographic transparency slides into the compartments of a compartmented magazine that is associated with a projector for projecting the images on the slides onto a screen.

BACKGROUND ART

Some of the most popular forms of photographic slide projection equipment in use today utilize compartmented magazines for holding a series of slides to be projected. These magazines are usually constructed to provide a plurality of individual compartments each capable of receiving one photographic slide therein. In some magazines the compartments are arranged along a linear path while in other magazines, of the so-called carousel type, the compartments are arranged in a circle to receive the slides in radial relation to the axis of the rotatable magazine.

Usually, each type of magazine is especially adapted for use in conjunction with a projector having powered means for receiving slides from the magazine and for returning the slide to the magazine. The equipment, thus, is highly automated and constitutes a convenient and highly reliable adjunct to a slide presentation. The magazines are, of course, separable from the projector unit and serve as convenient carriers for storing and transporting the series of slides therein.

One of the few shortcomings of compartmented magazine projection equipment is that it is difficult and sometimes frustrating to load slides into the magazine. This is particularly true when the person loading the magazine is simultaneously selecting and editing the slides to be arranged within the magazine. Ideally, the series of slides for a particular presentation should occupy a series of adjacent compartments, so that no blanks are left in the projection sequence. It is not uncommon for the person loading the compartmented magazine to decide, after having inserted several slides, that the next slide selected should appear at some earlier location in the presentation sequence. This then necessitates moving a number of slides into other compartments to make room for the most recently selected slide. When one considers that a compartmented magazine, particularly one of the carousel type, may contain 80 or more slides, the editing and loading procedure may be extremely burdensome. Even if the selection and editing procedure is separated from the loading procedure and the slides arranged in their proper sequence in a simple stack, the loading of the individual slides into the rather close fitting compartments of the magazine requires patience and dexterity.

Although automated photographic slide handling equipment has been devised in the past which would undoubtedly be capable of loading these compartmented magazines, such equipment is by and large far too complex and expensive for use by the average amateur photographer or user of inexpensive projection equipment sold to the general public.

DISCLOSURE OF INVENTION

This invention is concerned with apparatus which can be associated with a conventional compartmented magazine-projector combination so that actuation of the projector effects transfer of a series, or stack, of photographic slides from the loading apparatus into the compartmented magazine. Although this invention can be utilized in conjunction with manually actuated projectors, it is envisioned that in most instances the projector will be powered internally, by means such as an electric motor, and that that power unit will be utilized to effect loading of the magazine.

Specifically, the invention provides an open loading tray for receiving a stack of slides arranged in the order in which they are to be inserted into the magazine. This tray is interposed between the projector and a compartmented magazine adapted to be used in conjunction with that projector and the three units are operatively interconnected. The invention utilizes the means within the projector that are normally used to return a slide from the projection compartment to the magazine to effect transfer of slides from the feeding tray into the magazine. Similarly, the means within the projector which normally advances the compartmented magazine during a projection sequence is utilized to advance the magazine during the loading sequence so that when one compartment receives a slide from the loading tray, the magazine is advanced to present an open compartment for reception of the next slide from the tray. This operating sequence continues until all of the slides that are to be placed in the magazine are in place therein.

Because the acts of transferring slides from the tray to the magazine and of advancement of the magazine are performed in response to movement of standard components within the projector, no separate and expensive drive means need be provided for the loading apparatus. Therefore, what is provided is a relatively inexpensive, easily assembled adaptor for existing magazine projector equipment.

BRIEF DESCRIPTION OF DRAWINGS

This invention is described in detail hereinafter by reference to the accompanying drawings wherein:

FIG. 3 is a sectional view through the apparatus of FIG. 1 taken generally as indicated by the lines 3—3 in FIG. 1;

FIG. 4 is a sectional view through the apparatus taken generally as indicated by the line 4—4 in FIG. 3; and FIGS. 5 and 6 are sectional views corresponding to the views of FIGS. 3 and 4, respectively, but illustrating the components in a different operating condition.

BEST MODE FOR CARRYING OUT THE INVENTION

Figure 1:
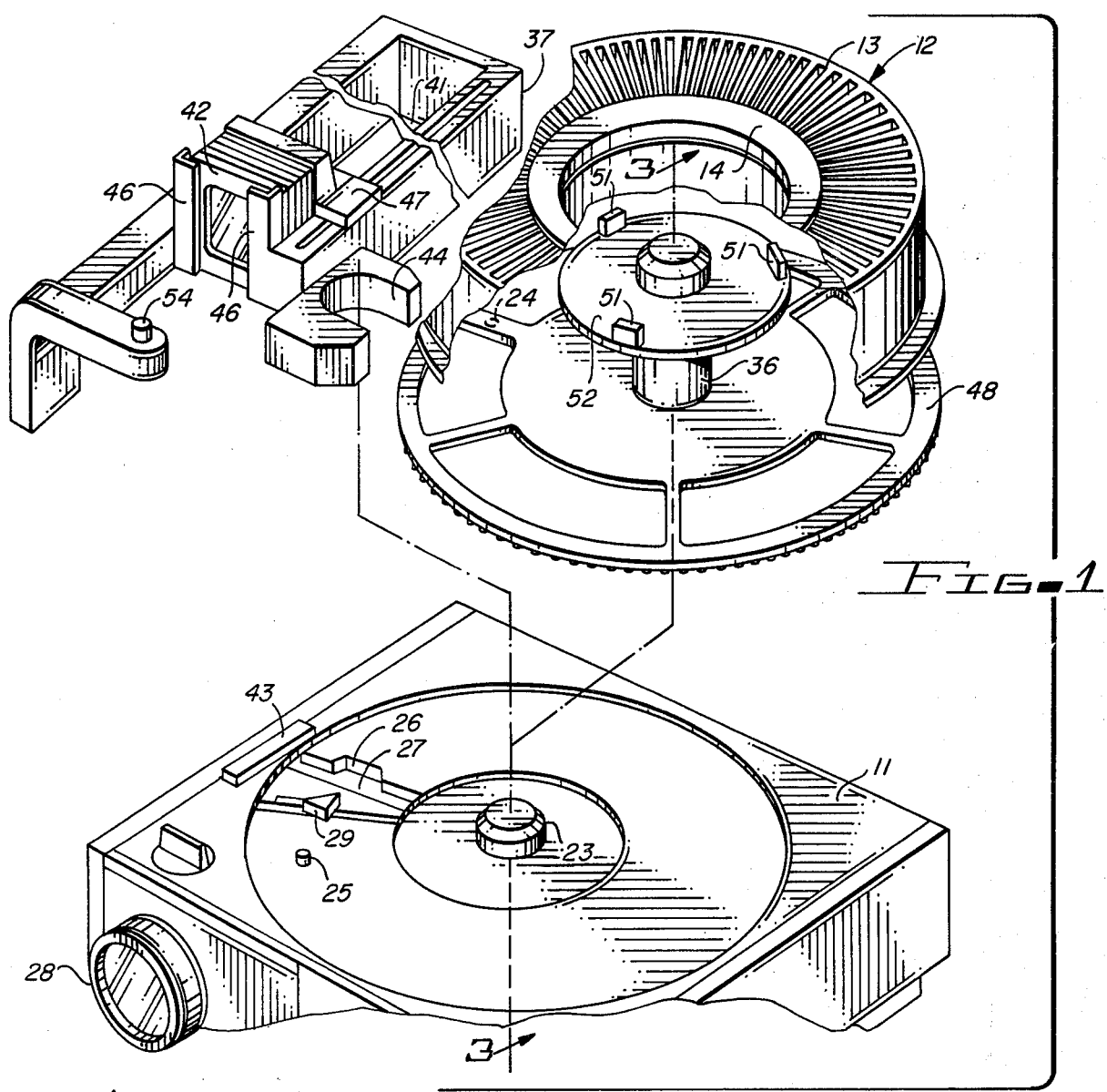
FIG. 1 is an exploded perspective view of magazine projector equipment incorporating the loading apparatus of this invention.
Figure 2:
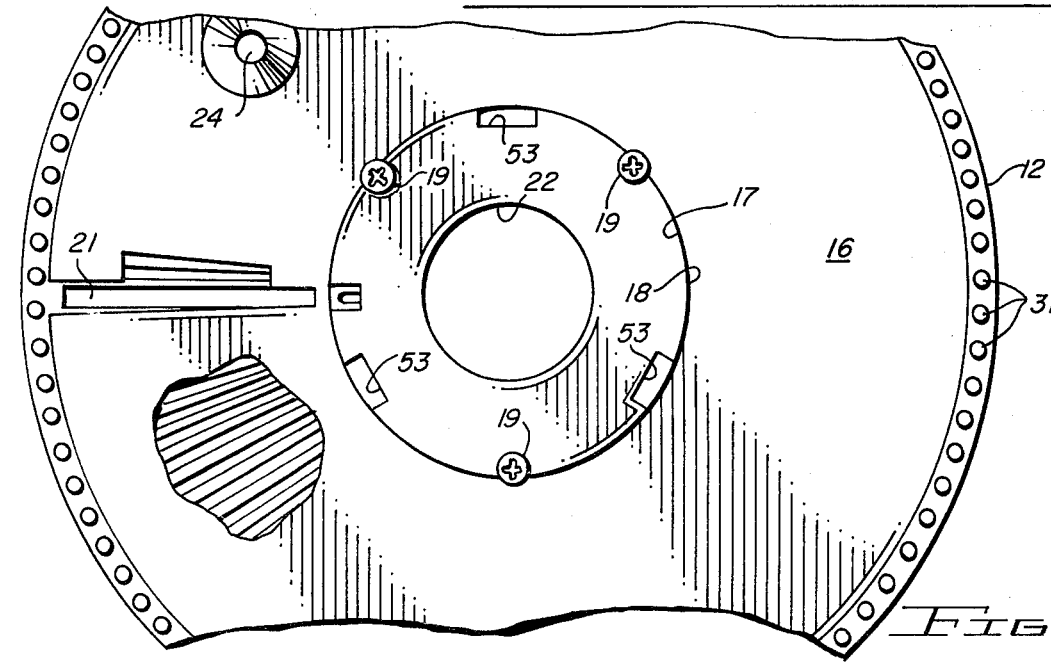
FIG. 2 is a fragmentary view of the underside of a conventional compartmented magazine which is to be loaded with photographic slides in accordance with this invention.

Referring particularly to FIG. 1, there is illustrated the loading apparatus of this invention associated with the principal components of a magazine slide projector combination consisting of a projector, indicated generally by the reference numeral 11, and a magazine indicated generally by the reference numeral 12. Both the projector 11 and the magazine 12 are of conventional construction and may be considered to be representative of several types of magazine projector equipment in use today. The particular magazine 12 illustrated in FIG. 1 is of the circular, or carousel, type having a plurality of compartments 13 disposed radially and vertically. In normal use of a multi-compartment magazine 12 photographic slides are inserted into the compartments 13 through the open top thereof and retained in place in the magazine by means of a removable retainer ring 14. Bottoms for the compartments 13 in magazine 12 are provided by a support disc 16 (see FIG. 2) which is mounted to the bottom of the magazine 12 in such a manner that the remainder of the magazine is rotatable with respect to the support disc. For this purpose, disc 16 has an opening 17 in the center thereof which is adapted to closely receive a downwardly projecting boss 18 on the main body of the magazine and a series of screws 19 are tapped into the boss 18 in such a manner that their heads overlap and hold disc 16 in place at the bottom of the magazine.

Support disc of magazine 12 is provided with a slot like opening 21 extending radially of the magazine beneath compartments 13.

When magazine 12 is in normal use in conjunction with projector 11 the magazine rests atop the projector with an opening 22 in the center of magazine boss 18 surrounding an alignment boss 23 projecting upwardly from the top of the projector 11. Support disc 16 of magazine 12 is provided with a registry opening 24 for receiving a register pin 25 which also projects upwardly from the top of projector 11. The purpose of the register pin is to prevent rotation of support disc 16 and to align the opening 21 therein above an opening 26 in the top wall of the projector which provides access to a projection compartment 27 located interiorally of the projector. As magazine 12 is advanced, i.e., turned about its vertical axis, the compartments 13 therein are brought into successive alignment with opening 21 in support disc 16 to permit slides therein to drop through opening 21 and opening 26 in the projector and to fall into projection compartment 27 where the image thereon is illuminated and projected through a lens 28 onto a screen.

Step by step advancement, i.e., incremental rotational movement, is imparted to the compartmented portion of a magazine 12 by a magazine advancing means associated with projector 11 and comprising a movable pawl 29 on the top of the projector. Pawl 29 is engageable with a plurality of downwardly depending toothlike projections 31 on a ring-like peripheral portion of magazine 12 (see FIG. 2).

In the continuing sequence of normal operation of the magazine projector equipment, a slide which has undergone projection of its image is returned to the compartment 13 of magazine 12 from whence it came by slide return means which is illustrated somewhat schematically in FIGS. 3 and 4. The return means comprises a lifting head 32 carried on the end of a pivotally mounted lever 33 which is movable about pivot 34 in the direction indicated by the arrow to lift a slide positioned within projection compartment 27. Electric motor means, not shown, is usually provided within the case of projector 11 to drive both the lever 33 of the lifting means and pawl 29 of the magazine advancing means. In normal operation, again, these means operate sequentially so that a slide that has been projected is lifted by the transporting means out of projection chamber 27 into one of the compartments 13 of magazine 12 and thereafter the magazine is incrementally rotated, or advanced, by the advancing means to move the compartment containing the just projected slide away from the slot 21 in magazine disc 16 and move the adjacent chamber 13 over opening 21 so that the slide therein may drop into the projection compartment. This motor driven sequence for the projector 11 can be performed automatically in accordance with a timer control or under manual initiation by means of a switch actuated by the operator, both of which systems are well understood in the art and further description herein is not deemed to be essential to an understanding of the present invention.

This invention is directed to apparatus used in conjunction with the projector 11 and magazine 12 for the purpose of loading photographic slides into the magazine 12 utilizing the drive features of the standard projector 11. One key component of the loading apparatus is a support and drive spindle 36 adapted to position magazine 12 above and in spaced relation to the top wall of projector 11 so as to permit a loading tray, another key component, indicated generally by the reference numeral 37, to be interposed between the magazine and the projector. Another component of the loading apparatus is a dummy slide 38 adapted to be positioned within the projection compartment 27 of projector 11 for cooperation with the slide returning means of the projector. For this purpose, the dummy slide 38 is provided at its lower edge with an opening to receive lifting head 32 of the slide returning means.

Loading tray 37 is provided with a trough 41 for containing a stack of slides 42. Tray 37 is removably positioned or located atop projector 11 between the projector and magazine 12 by an alignment projection 43 on the top of the projector and yoke member 44 protruding transversely from tray 37 and engageable with spindle 36. The cooperation between tray 37, projection 43 on projector 11, and spindle 36 is such that the tray may be separated from the projector 11 and the magazine 12 simply by moving the tray sideways out from beneath the magazine.

The open top of tray 37 permits slides 42 to be stacked and arranged within trough 41. The task of arranging slides in proper sequence for a presentation is considerably easier when the selecting and editing operation is performed utilizing open tray 37 than is the case with selecting slides and loading them directly into magazine 12, as was described above.

Tray 37 is also provided with guide rails 46 at one end of trough 41 by which the endmost slide 42 in the stack of slides can be guided upwardly from the tray into magazine 12 when the tray is disposed beneath the magazine. As slides are removed from tray 37 during the process of loading magazine 12 the remaining slides in the stack are advanced toward guide trails 46 by means of a lightly spring-loaded follower 47.

Transfer of slides 42 from tray 37 into magazine 12 is effected utilizing the slide removing means of the projector 11. The slide removing means is adapted for this purpose by the dummy slide 38 which is disposed within projection compartment 27 and attached to the slide lifting head 32 of the slide removing means. The two pairs of FIGS. 3–4 and 4–5 illustrate the movement of the various compartments as a slide 42 is transferred from tray 37 and loaded into a compartment 13 of magazine 12. Whenever the slide returning means of projector 11 is activated, lifting arm 33 is rotated upwardly about its pivot 34 lifting head 32 and dummy slide attached thereto upwardly into engagement with the endmost slide 42 in tray 37. Continued movement of head 32 and dummy slide 38 lifts slide 42 through the opening 17 in the support disc of magazine 12 into a compartment 13 of the magazine (see FIG. 5). The slide 42 thus transferred and loaded into magazine 12 is retained therein by virtue of the magazine being advanced, i.e., rotated, an incremental amount equal to the width of a compartment 13 (see FIG. 6).

Advancement of magazine 12 to trap slides 42 loaded in its compartments and to expose the next available compartment 13 is effected utilizing the magazine advancing means contained within projector 11 and the support and drive spindle 36. The lower end of spindle 36 has an opening therein so that the spindle may receive and rotate on alignment boss 23 atop projector 11. Rotation of spindle 36 is effected by a drive ring 48 having a series of toothlike projections 49 depending therefrom which are virtually identical to the tooth-like projections 31 normally provided on the magazine 12. The construction of drive ring 36 is such that when spindle 36 is in position atop projector 11 the tooth-like projections 49 are in position to be engaged by the pawl 29 of the magazine advancing means of the projector so that when the advancing means is actuated there is an incremental rotation of ring 49 and spindle 36. Rotation of spindle 36 is transmitted to magazine 12 by one or more lugs 51 carried by a hub 52 at the upper end of spindle 36 and adapted to be received in slot-like openings 53 in boss 18 at the base of magazine 12 (see FIGS. 1 and 2).

For proper operation of the loading apparatus, it is essential that the support disc 16 of magazine 12 remain stationary with its opening 21 aligned with guide rails 46 on tray 37. To position disc 16 properly, the tray 37 is provided with an upwardly projecting register pin 54 disposed directly above register pin 25 which is utilized to position support disc 16 when the magazine rests atop the projector 11 for projecting slides. Pin 54 performs a like function when the magazine is being loaded. Magazine 12 may be lifted a short distance to clear resgister pin 54 as tray 37 is moved into and out of position between the magazine and projector 11.

After a slide 42 has been captured within a compartment 13 of magazine 12 by advancement of the magazine, dummy slide 38 is retracted downwardly from the tray 37 back into projection compartment 27 of the projector 11. As the dummy slide 38 exits the tray 37, spring loaded follower 47 urges the next slide 42 in the stack within trough 41 up against the guide rails 46 in position to be transferred, or loaded, into the magazine 12 when the slide removing means of the projector 11 is again activated.

With the loading apparatus here disclosed it is possible to rapidly load the entire stack of slides 42 contained within tray 37 into magazine 17, all automatically utilizing the power apparatus within the projector and with no manual manipulation of the slides.

Although alluded to earlier, it should be emphasized that this invention is useful in conjunction with linearly movable compartmented magazines as well as the rotating magazines described in detail herein.

What is claimed is:

1. Loading apparatus for a slide magazine having individual compartments for containing photographic slides, said magazine being adapted for use with a projector adapted to receive slides from the magazine, said projector being equipped with means for returning slides to a compartment of said magazine and means for advancing the magazine to expose the next compartment of the magazine, said loading apparatus comprising a tray adapted to contain a stack of slides to be loaded into the compartments of said magazine, means for positioning said tray between said projector and said magazine, means associated with said tray and responding to motion of the slide returning means of said projector for moving the endmost slide from said stack of slides in said tray into a compartment of said magazine and means connecting the magazine advancing means of said projector to the magazine to advance said magazine and expose the next compartment for loading with a slide.

2. Loading apparatus for a carousel slide magazine having individual compartments for containing photographic slides, said magazine being adapted for use with and to rest atop a projector having means for projecting the image on said slides onto a screen, said projector being adapted to receive individual slides from the magazine into a projection compartment and being equipped with powered means for returning slides from said projection compartment to the magazine, said projector being further equipped with powered means which is normally provided to incrementally rotate a drive ring provided on said magazine to expose successive compartments of the magazine, said loading apparatus comprising a tray adapted to contain a stack of slides to be loaded into the compartment of said magazine, means for positioning said tray atop said projector above said projection compartment, means for supporting said magazine above said tray, means associated with said tray and responding to motion of the slide returning means of said projector for moving the endmost slide from said stack of slides in said tray into a compartment of said magazine and means responding to movement of said magazine rotating means of the projector for incrementally rotating said magazine on said supporting means to advance said magazine and expose the next compartment therein for loading with a slide.

3. The loading apparatus of claim 2 wherein the means responding to motion of the slide returning means of said projector comprises a member adapted to be positioned in said projection compartment of the projector.

4. The loading apparatus of claim 2 wherein the means for supporting said magazine and the means for responding to movement of the magazine rotating means of the projector comprise a rotatable spindle carrying the magazine at its upper end and a drive ring at its lower end adapted to be engaged by said rotating means.

5. The loading apparatus of claim 4 wherein the drive ring on said spindle is substantially the same as the drive ring normally provided on said magazine.

* * * * *